US012660759B2

(12) United States Patent
Somarowthu et al.

(10) Patent No.: US 12,660,759 B2
(45) Date of Patent: Jun. 23, 2026

(54) CONTROL SYSTEM AND METHOD FOR BALERS USING CROP CONSTITUENTS

(71) Applicant: Deere & Company, Moline, IL (US)

(72) Inventors: Mahesh Somarowthu, Pune (IN); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/889,560

(22) Filed: Sep. 19, 2024

(65) Prior Publication Data

US 2026/0076308 A1     Mar. 19, 2026

(51) Int. Cl.
A01F 15/00     (2006.01)
A01F 15/08     (2006.01)
A01F 15/07     (2006.01)

(52) U.S. Cl.
CPC ...... A01F 15/0825 (2013.01); A01F 15/0816 (2013.01); *A01F 2015/076* (2013.01)

(58) Field of Classification Search
CPC .. A01F 15/08; A01F 15/0816; A01F 15/0833; A01F 2015/0808; A01F 18/0825; A01F 15/0715; A01F 2015/076; A01F 2015/077
USPC .................................................. 53/116, 341
See application file for complete search history.

(56) References Cited

U.S. PATENT DOCUMENTS 5,819,643 A * 10/1998 McIlwain ............. B30B 9/3025
                                                        100/192
6,483,583 B1 * 11/2002 Wright ................. G01J 3/2803
                                                        460/7

7,168,636 B2     1/2007 Lebeda et al.
7,437,866 B2 * 10/2008 Smith ................. A01F 15/0833
                                                        56/341
7,804,588 B2     9/2010 Kormann et al.
8,860,443 B1   10/2014 Roberts
9,759,689 B2 *  9/2017 Guo ...................... H04B 10/27
                    (Continued)

FOREIGN PATENT DOCUMENTS

CN          115226504 A     10/2022
EP            3679784 A1     7/2020
                    (Continued)

OTHER PUBLICATIONS

"John Deere HarvestLab 3000 and Constituent Sensing" website download (3 pages) (undated but admitted to be prior art).
                    (Continued)

*Primary Examiner* — Jacob A Smith
(74) *Attorney, Agent, or Firm* — Lucian Wayne Beavers; Patterson Intellectual Property Law, PC

(57)          ABSTRACT

A baler for forming a bale of crop material includes a bale chamber for forming the bale. One or more constituent property sensors are configured to detect one or more constituent properties other than moisture content of the crop material used to form the bale and to generate one or more sensor signals corresponding to the one or more constituent properties. One or more bale forming actuators are configured to adjust one or more physical characteristics of the bale as the bale is formed. A controller is configured to receive the sensor signals and to generate one or more control signals to the one or more bale forming actuators to adjust the one or more physical characteristics of the bale at least in part in response to the one or more sensor signals.

18 Claims, 6 Drawing Sheets

(56)                    References Cited

U.S. PATENT DOCUMENTS

| | | | |
|---|---|---|---|
| 10,785,918 B2 | 9/2020 | Roberts | |
| 2010/0242747 A1 | 9/2010 | Kraus | |
| 2015/0262351 A1* | 9/2015 | Dima | A01D 41/1278 |
| | | | 382/110 |
| 2017/0276623 A1* | 9/2017 | MacNeill | A01F 15/0816 |
| 2018/0192591 A1 | 7/2018 | Monbaliu | |
| 2020/0128754 A1* | 4/2020 | Hamilton | G06K 19/04 |
| 2022/0192098 A1 | 6/2022 | Smith et al. | |
| 2022/0240452 A1 | 8/2022 | Kraus | |
| 2023/0180662 A1 | 6/2023 | Palla et al. | |
| 2023/0263099 A1 | 8/2023 | Jadhao | |
| 2023/0292669 A1* | 9/2023 | Ponkshe | A01F 15/08 |
| | | | 100/73 |
| 2023/0371434 A1 | 11/2023 | Kuchipudi | |
| 2024/0032478 A1 | 2/2024 | Chaney | |

FOREIGN PATENT DOCUMENTS

| | | | |
|---|---|---|---|
| EP | 3818814 A1 | 5/2021 | |
| EP | 4245120 A1 | 9/2023 | |
| WO | WO 2011039140 A1 | 4/2011 | |

OTHER PUBLICATIONS

"Harvest Tec" brochure (16 pages) (undated but admitted to be prior art).
Extended European Search Report and Written Opinion issued in European Patent Application No. 25190625.1 dated Nov. 11, 2025, in 11 pages.

* cited by examiner

CONTROL SYSTEM AND METHOD FOR BALERS USING CROP CONSTITUENTS

FIELD OF THE DISCLOSURE

The present disclosure relates to a system for control of a baler for forming a bale of harvested crop material.

BACKGROUND

Agricultural equipment, such as, for example, balers, among other bale implements, can be used to gather, compress, and/or shape crop material into bales, thereby producing crop bales. A variety of different types of crops can be baled by such agricultural equipment, including, for example, hay, flax straw, cotton, silage, and salt march hay, among other crops. In at least some instances, the crop can be cut, and possibly raked or otherwise manipulated, before being packaged with a bale implement.

The primary use of hay that is baled by a baler is to feed livestock. The hay is cut, sometimes raked or otherwise manipulated, and can then be baled with a baler. Each individual bale has different values of feeding quality even though multiple bales can appear the same. The differences in feeding quality are a result of variation in multiple factors regarding the constituent materials which make up the bale and regarding the physical formation of the bale.

Previously any automation of the bale forming process to improve the quality of the resulting bales has focused on measurement of moisture content of the material being baled, and adjustment of the addition of hay preservative to the material as it is baled. This has been done, for example, with the Harvest Tec hay preservative applicator system available from Harvest Tec, Inc. of Hudson WI.

There is a continuing need for more sophisticated baler control systems which take into account constituent parameters other than moisture content and which can control physical attributes of the formed bales other than preservative additive.

SUMMARY OF THE DISCLOSURE

In one embodiment a baler for forming a bale of crop material includes a bale chamber for forming the bale. One or more constituent property sensors are configured to detect one or more constituent properties other than moisture content of the crop material used to form the bale and to generate one or more sensor signals corresponding to the one or more constituent properties. One or more bale forming actuators are configured to adjust one or more physical characteristics of the bale as the bale is formed. A controller is configured to receive the sensor signals and to generate one or more control signals to the one or more bale forming actuators to adjust the one or more physical characteristics of the bale at least in part in response to the one or more sensor signals.

In another embodiment a baler for forming a bale of crop material includes a bale chamber for forming the bale. One or more constituent property sensors are configured to detect one or more constituent properties of the crop material used to form the bale and to generate one or more sensor signals corresponding to the one or more constituent properties. One or more bale forming actuators are configured to adjust compaction and/or wrap tension of the bale as the bale is formed. A controller is configured to receive the sensor signals and to generate one or more control signals to the one or more bale forming actuators to adjust the compaction and/or the wrap tension of the bale at least in part in response to the one or more sensor signals.

In another embodiment a method is provided of forming a bale of crop material, including:

detecting one or more constituent properties other than moisture content of the crop material using one or more constituent property sensors;

generating one or more sensor signals with the one or more constituent property sensors, the signals corresponding to the one or more constituent properties other than moisture content;

receiving the sensor signals with a controller;

generating one or more control signals with the controller; and adjusting one or more bale forming actuators in response to the one or more control signals, and thereby automatically adjusting one or more physical characteristics of the bale as the bale is formed.

Numerous objects, features and advantages of the present invention will be readily apparent to those skilled in the art upon a review of following description in conjunction with the accompanying drawings.

DETAILED DESCRIPTION

Figure 4:
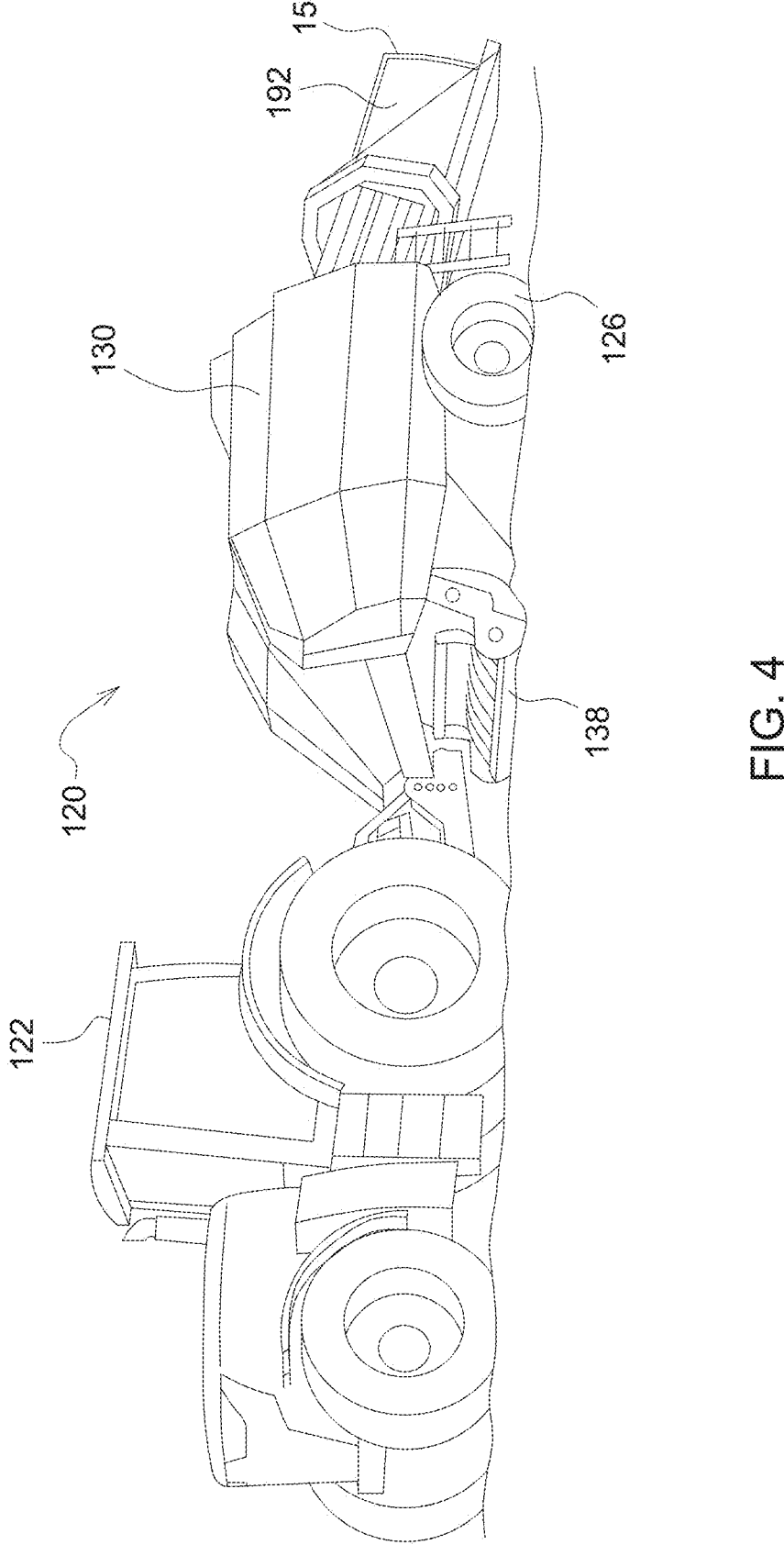
FIG. 4 is a schematic side elevation view of a large rectangular baler being pulled by a tractor.
Figure 5:
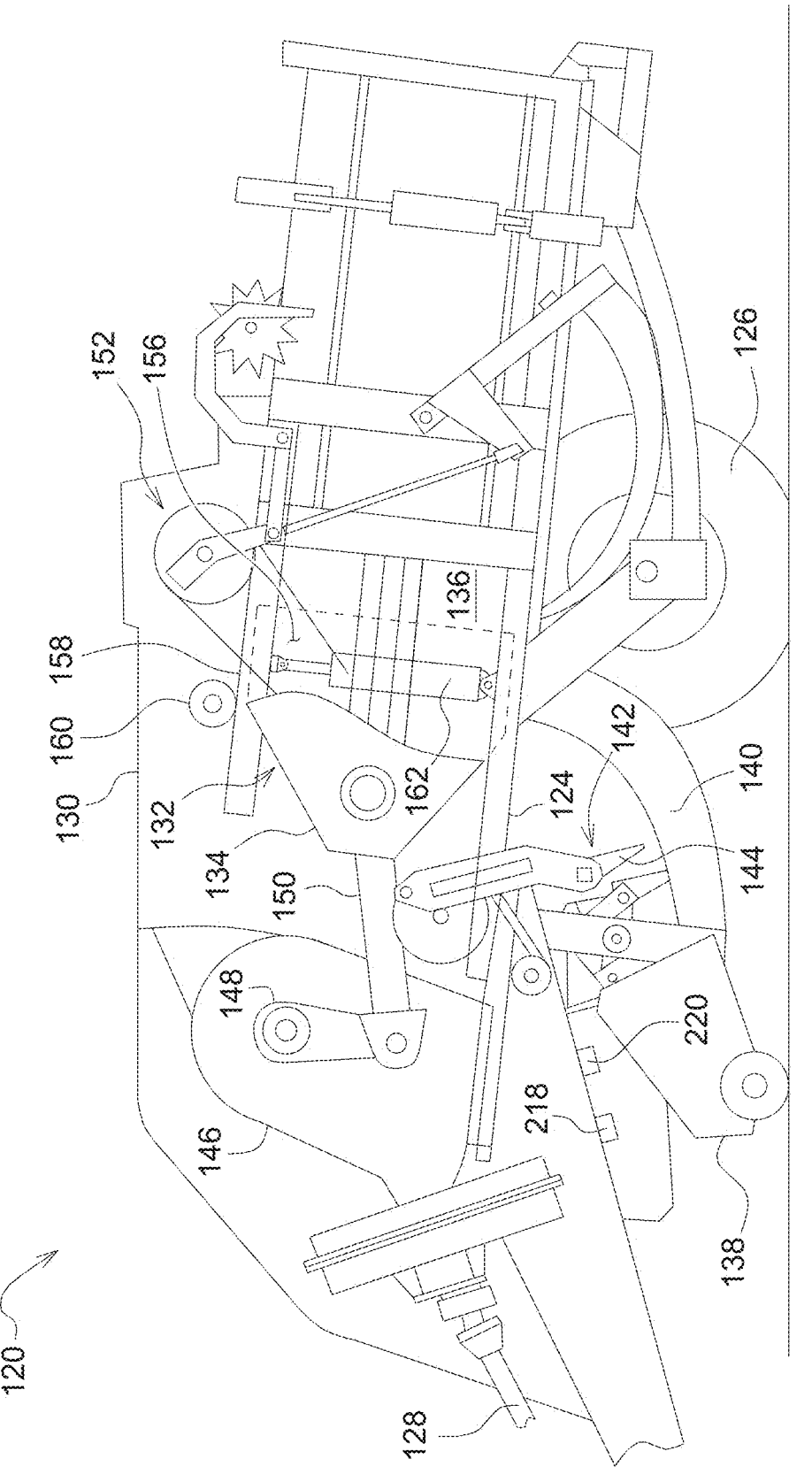
FIG. 5 is a schematic side elevation view of the internal components of the baler of FIG. 4.

The present disclosure provides systems and methods for operating balers in response to detecting one or more constituent properties of the crop being baled. The baler may for example be a round baler as shown in FIGS. 1-3, or the baler may be a large rectangular baler as shown in FIGS. 4-5.

Figure 1:
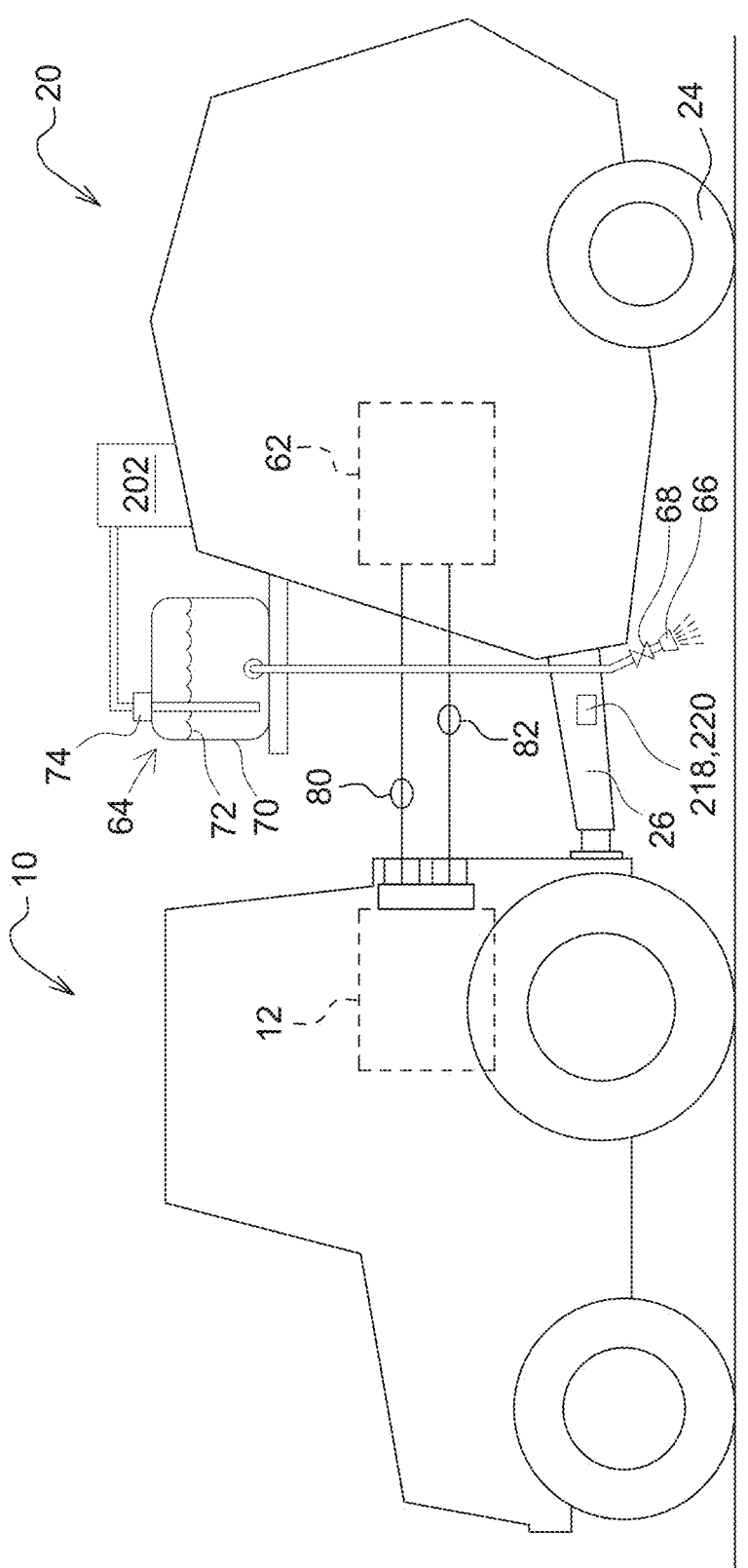
FIG. 1 is a schematic side elevation view of a round baler being pulled by a tractor.

Round Balers:

FIG. 1 schematically shows a round baler 20 being pulled by a tractor 10. The tractor includes a tractor hydraulic system schematically indicated at 12.

Figure 2:
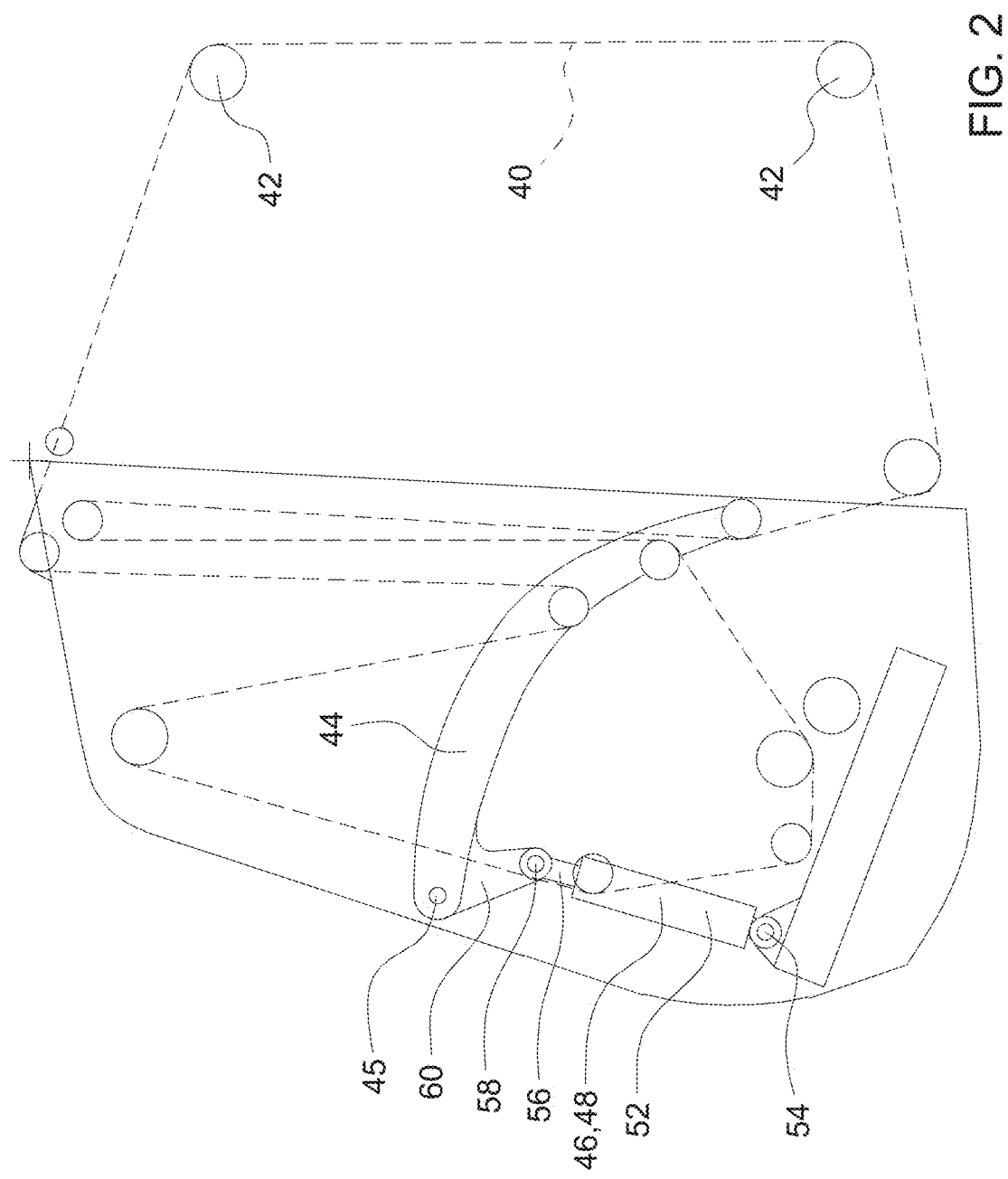
FIG. 2 is a schematic side elevation view of a belt system and tensioning actuator of the round baler of FIG. 1.
Figure 3:
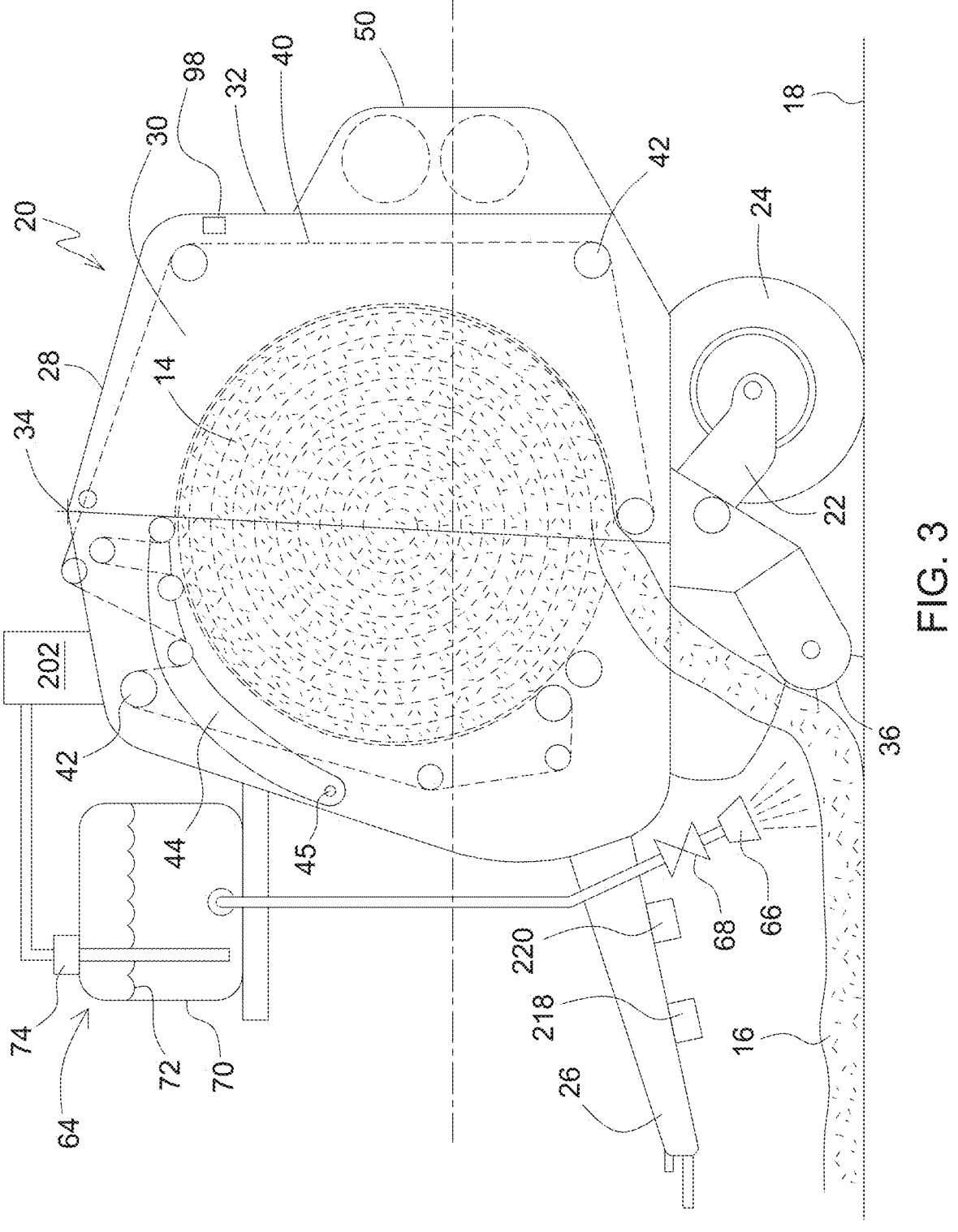
FIG. 3 is a schematic side elevation view of the round baler of FIGS. 1 and 2, showing a round bale being formed therein and depicting a preservative spraying system.

The mechanical details of the round baler 20 are seen in FIGS. 2 and 3. The round baler 20 includes a frame 22. One or more ground engaging elements 24, such as but not limited to one or more wheels and/or tracks, are attached to and rotatably supported by the frame 22. A tongue 26 may be coupled to the frame 22 at a forward end of the frame 22. A hitch arrangement may be included with the tongue 26. The hitch arrangement may be used to attach the round baler 20 to a traction unit, such as but not limited to the agricultural tractor 10. In other implementations, the round baler 20 may be self-propelled, in which case the traction unit and the round baler 20 are configured as a single, self-propelled vehicle.

The round baler 20 includes a housing or body 28 forming a baling chamber 30. The body 28 is attached to and supported by the frame 22. The body 28 may include one or more walls or panels that at least partially enclose and/or define the baling chamber 30. The round baler 20 further includes a rear gate 32. The rear gate 32 is attached to and rotatably supported by the body 28. The rear gate 32 is positioned adjacent a rearward end of the frame 22 and is pivotably moveable about a gate axis 34. The gate axis 34 is generally horizontal and perpendicular to a central longitudinal axis of the frame 22. The rear gate 32 is moveable between a closed position for forming a bale 14 within the baling chamber 30, and an open position for discharging the bale 14 from the baling chamber 30. The rear gate 32 is further moveable to at least one intermediate position disposed between the open position and the closed position.

The round baler 20 includes a pick-up 36 disposed proximate the forward end of the frame 22. The pickup gathers crop material 16 from a ground surface 18 and directs the gathered crop material toward and into an inlet of the baling chamber 30. The pickup may include, but is not limited to tines, forks, augers, conveyors, baffles, etc., for gathering and moving the crop material. The round baler 20 may be equipped with a pre-cutter (not shown), disposed between the pickup and the inlet. As such, the pre-cutter is disposed downstream of the pickup and upstream of the inlet relative to a direction of travel of the crop material. The pre-cutter cuts or chops the crop material into smaller pieces.

The round baler 20 shown in the Figures and described herein is depicted and described as a variable chamber baler. As is understood by those skilled in the art, the variable chamber baler includes a plurality of longitudinally extending side-by-side forming belts 40 that are supported by a plurality of rollers 42. The bale 14 is formed by the forming belts 40 and one or more side walls of the housing. The forming belts 40 may also be referred to as tension belts 40.

The crop material 16 is directed through the inlet and into the baling chamber 30, whereby the tension belts 40 roll the crop material in a spiral fashion into the bale 14 having a cylindrical shape. The tension belts 40 apply a constant pressure to the crop material as the crop material is formed into the bale 14. A belt tensioning arm 44 pivots around a mounted axis 45 within the front frame of the baler 20 and continuously moves with the tension belts 40 radially outward relative to a center of the cylindrical bale 14 as the diameter of the bale 14 increases. There may be more than one belt tensioning arm 44. The belt tensioning arm 44 is connected to a first tension cylinder 46 and a second tension cylinder 48 which are spaced apart across the width of the baler 20.

FIG. 2 shows the mechanical connection of the first tension cylinder 46 to the belt tensioning arm 44. The first tension cylinder 46 includes a cylinder 52 pivotally connected at 54 to the frame 22 and a rod 56 pivotally connected at 58 to an extension 60 of the belt tensioning arm 44. As the bale 14 grows within the baling chamber 30, the rod ends of the tension cylinders 46, 48 are pulled outward thus increasing hydraulic pressure in the rod ends. Conversely, when hydraulic pressure is applied to the rod ends of the tension cylinders 46, 48 the belt tensioning arm 44 is pulled downward which increases tension on the tension belts 40.

The tension cylinders 46, 48 may generally be referred to as bale forming actuators 46, 48 configured to adjust one or more physical characteristics of the bale 14 as the bale 14 is formed. In this case the physical characteristic is the density of the bale 14. The tension belt 40 and the tension cylinders 46, 48 may be described as a compression system configured to adjust a compression of the bale 14 as the bale 14 is formed in the bale chamber 30, the compression system including the compression actuators 46, 48 configured to adjust the density of the bale 14.

Depending upon the design of the round baler in some embodiments a lowering motion of the belt tensioning arm 44 may engage the belt tensioning arm 44 itself with the periphery of the round bale to squeeze the bale and provide increased bale compaction regardless of the tension state of the tension belts 40.

The round baler 20 includes a wrapping and/or tying system 50. The wrapping and/or tying system 50 is operable to wrap the bale 14 with a wrap material 76 inside the baling chamber 30. Once the bale 14 is formed to a desired size, the wrap system 50 feeds the wrap material 76 into the baling chamber 30 to wrap the bale 14 and thereby secure the crop material in a tight package and maintain the desired shape of the bale 14. The wrap material may include, but is not limited to, a twine, a net mesh, or a solid plastic wrap.

Figure 6:
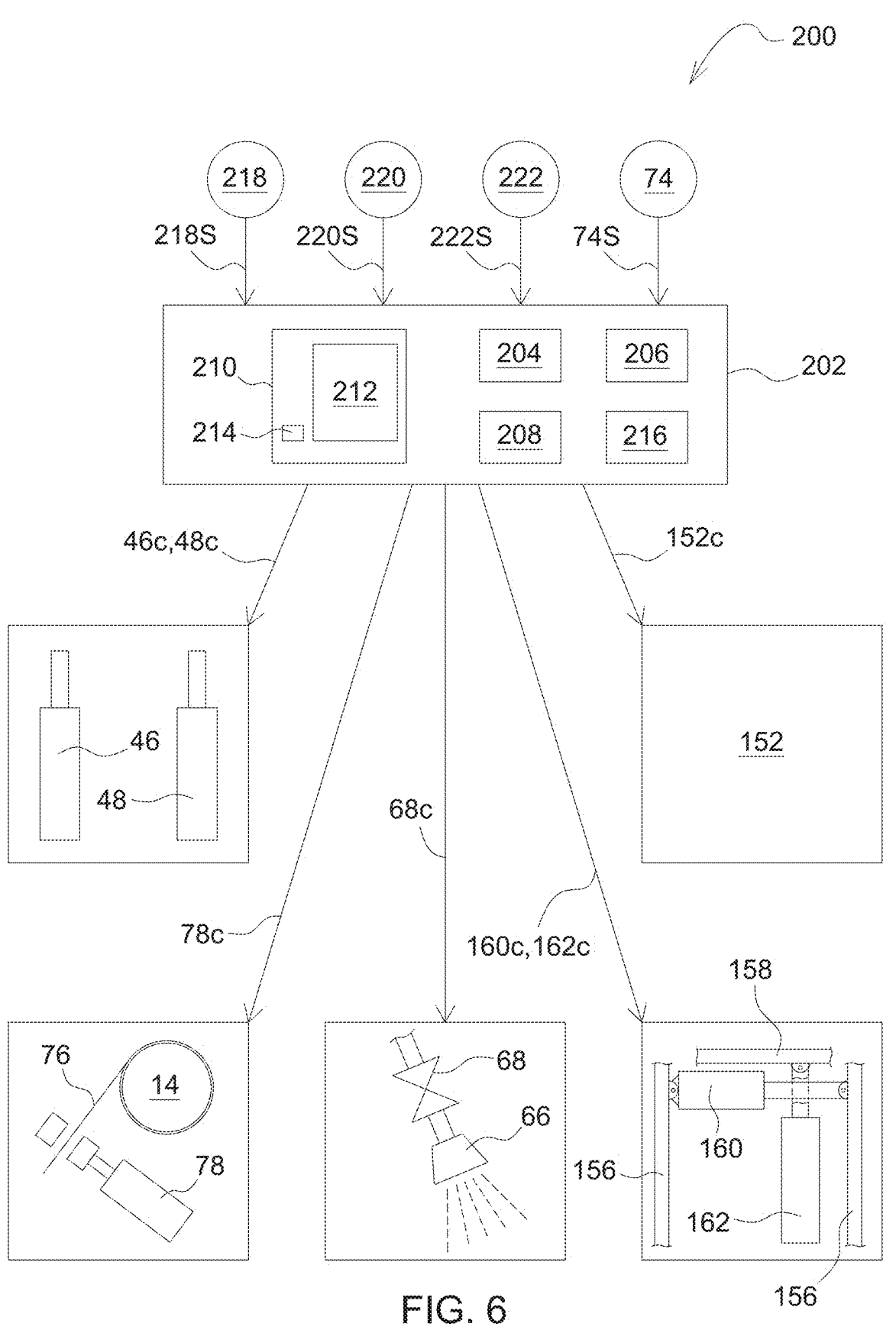
FIG. 6 is a schematic drawing of a control system for either the round baler or the large rectangular baler.

As schematically shown in FIG. 6, the wrapping system 50 is configured to wrap the bale 14 with the wrap material 76, the wrapping system including a wrapping actuator 78 configured to adjust a wrap tension of the wrapping material 76 as the bale 14 is wrapped. The wrapping actuator 78 may for example adjust a gripping force against which the wrap material 76 must be pulled from a roll of wrap material. The wrapping actuator 78 is another example of a bale forming actuator configured to adjust one or more physical characteristics of the bale 14 as the bale 14 is formed; in this case the physical characteristic is the wrap tension of the bale.

In some embodiments movement of the gate into the open position simultaneously moves the tension belts 40 clear of the formed bale 14, and allows the formed and wrapped bale 14 to be discharged through the rear of the baling chamber 30.

The round baler 20 includes a baler hydraulic system 62 schematically indicated in FIG. 1, which includes the various electro-hydraulic valves for controlling flow to the various actuators such as first tension cylinder 46 and second tension cylinder 48. The baler hydraulic system 62 may be hydraulically connected to the tractor hydraulic system 12 via conduits 80 and 82 as seen in FIG. 1. In some examples, the actuators may be operated with other forms of power such as electricity.

The round baler 20 may include a preservative additive system 64 configured to add a preservative to the crop material 16, the preservative additive system 64 may include a nozzle 66 and a nozzle control valve 68 configured to control a flow rate of preservative added to the crop material 16. The preservative additive system 64 may further include a tank 70 containing the preservative 72. A level sensor 74 may detect a level of the preservative 72 in the tank 70 and communicate that level to the controller 202 discussed below.

Large Rectangular Baler:

FIG. 4 schematically shows a large rectangular baler 120 being pulled by a tractor 122. The large rectangular baler 120 is also sometimes referred to in the industry as a large square baler 120. As depicted in FIG. 4, the baler implement 120 may move across a field and gather and process crop material to form a bale 192. The baler implement 120 may then eject the formed bale from the rear of the baler implement 120.

Referring to FIG. 5, the exemplary implementation of the baler implement 120 includes a frame 124, ground engaging devices 126, such as but not limited to wheels and/or tracks, and an input shaft 128, such as a power-take-off (PTO) shaft, which can receive rotational power from a power source, such as the traction unit 122.

The baler implement 120 includes a housing 130 or body, which generally shields various internal components of the baler implement 120. The housing 130 is attached to and supported by the frame 124. The baler implement 120 includes a bale forming system 132. The bale forming system 132 is operable to form the gathered crop into a shape defining the bale. In the example implementation described herein, the bale forming system 132 includes a plunger 134 moveable in a reciprocating motion within a baling chamber 136. The plunger 134 compresses the crop material within the baling chamber 136 to form crop material into the bale.

The housing 130 includes side walls 156 and a ceiling 158 that form and/or define the baling chamber 136. The baling chamber 136 may alternatively be referred to as a compression chamber for forming the bale 192. The positions of the side walls 156 and ceiling 158 may be adjusted by side wall compression actuator 160 and ceiling compression actuator 162, respectively, shown schematically in FIGS. 5 and 6. The adjustment of the compression actuators 156 and/or 158 can adjust a cross-sectional area of the baling chamber 136 through which the plunger 134 must push the bale, thereby adjusting a density or compaction of the bale 192 as it is formed in the bale chamber 136.

The baler implement 120 includes a pick-up mechanism 138. The pick-up mechanism 138 is disposed proximate the forward end of the frame 124. The pick-up mechanism 138 gathers crop material from the ground surface and directs the gathered crop material toward and into an inlet of the baling chamber 136 of the baler implement 120. The pickup may include, but is not limited to tines, forks 144, augers, conveyors, baffles, etc., for gathering and moving the crop material. The baler implement 120 may be equipped with a pre-cutter, disposed between the pickup and the inlet. As such, the pre-cutter is disposed downstream of the pickup and upstream of the inlet relative to a direction of travel of the crop material. The pre-cutter cuts or chops the crop material into smaller pieces.

The pick-up mechanism 138 directs the gathered crop material into a pre-compression passageway 140, which stores a volume of gathered crop material. A feeder system 142 includes a plurality of forks 144, which are timed to move the crop material from the pre-compression passageway 140 into the baling chamber 136.

The input shaft 128 or PTO shaft is connected to an input of a transmission 146 to provide rotational power to the baler implement 120 from the traction unit 122 or other associated vehicle or power source. The transmission 146 includes a gearbox which converts the rotational motion of the input shaft 128 along a generally longitudinal axis of the baler implement 120 to an output of the transmission 146 having a rotational motion along a generally transverse axis of the baler implement 120.

The baler implement 120 includes a crank arm 148 connected to the output of the transmission 146. Crank arm 148 may also be referred to as a plunger actuator 148. A connecting link 150 interconnects the crank arm 148 and the plunger 134. The crank arm 148 rotates based upon the output of the transmission 146 and the plunger 134 moves in a reciprocal motion within the compression chamber as the crank arm 148 rotates. The plunger 134 extends into the compression chamber, thereby compressing the crop material, and then at least partially retracts from the compression chamber, at which time the feeder system 142 moves more crop material into the baling chamber 136, i.e., compression chamber.

When the bale is formed within the baling chamber 136, a knotter system 152 wraps a plurality of strands 154 of twine around the bale to secure the shape of the bale. When the baler implement 120 is configured as the large square baler, such as described herein, the knotter system 152 wraps the strands 154 of twine around a longitudinal perimeter or extent, i.e., the longest length of the bale, with each individual strand 154 of twine encircling the bale. The knotter system 152 ties each end of each respective strand 154 of twine together to form a knot, securing each respective strand 154 of twine in place. The knotter system 152 may be adjusted to adjust the tension of the strands 154 wrapping the bale 192. Thus, the knotter system 152 may also be described as a bale forming actuator configured to adjust one or more physical characteristics of the bale 192 as the bale 192 is formed. In this case the physical characteristic is the wrap tension of the strands 154.

In the example implementation shown in the figures and described herein, the completed bale 192 is pushed off a rearward end of the baler implement 120 by a subsequently formed bale, or otherwise discharged off the rearward end of the baler implement 120 by a powered roller or some other discharge mechanism, and whereby the bale is deposited on the ground surface.

Controller:

Both the round baler 20 of FIGS. 1-3 and the large rectangular baler 120 of FIGS. 4-5 may have a control system 200 associated therewith. Controller 200 may be configured to receive the sensor signals and to generate one or more control signals to the one or more bale forming actuators to adjust the one or more physical characteristics of the bale at least in part in response to the one or more sensor signals. The following description of the control system 200 is presented in the context of the round baler 20 of FIGS. 1-3 but is equally applicable to the large rectangular baler 120 of FIGS. 4-5.

As schematically illustrated in FIG. 6, the round baler 20 includes a control system 200 including a controller 202. The controller 202 may be part of the machine control system of the round baler 20, or it may be a separate control module. The controller 202 may be mounted in the operator's cabin of the tractor 10 or it may be mounted on the frame 22 of the round baler 20. The controller 202 is configured to receive input signals from sensors as well as other information regarding the operation of the round baler 20. The signals transmitted from the various sensors to the controller 202 are schematically indicated in FIG. 6 by lines connecting the sensors to the controller with an arrowhead indicating the flow of the signal from the sensors to the controller 202.

The sensors may include a moisture sensor 218 configured to detect the moisture content of the crop material used to form the bale. The moisture content may be expressed as a % moisture in the crop material being baled, or it may be indirectly expressed as a dry matter content which is the % of the crop material that is left after all moisture is removed. A signal 218S from sensor 218 is communicated to controller 202.

The sensors may further include one or more sensors 220 configured to detect one or more constituent properties other than moisture content of the crop material used to form the bale. The one or more constituent properties other than moisture content include one or more of the constituent properties selected from the group consisting of: dry matter content, crude protein content, crude starch content, neutral detergent fiber content, acid detergent fiber content, crude sugar content, crude fat content, metabolized energy content and oil content. A signal 220S from sensor 220 is communicated to controller 202.

The sensors 218 and 220 may be located adjacent the inlet to the baler 20 or 120 as schematically shown in FIGS. 1, 3 and 5.

The controller 202 may also receive signals from one or more global navigation system sensors 222 configured to detect a geographic position of the crop material being baled. A signal 222S from sensor 222 is communicated to controller 202. The controller 202 is configured to generate a constituent map recording the various constituent properties of the crop material in relation to the geographic position of the crop material being baled.

Similarly, the controller 202 will generate control signals for controlling the operation of the various actuators described herein, which control signals are indicated schematically in FIG. 6 by lines connecting the controller 202 to the various actuators discussed above. Control signal 46C, 48C is sent to control compression cylinders 46 and 48. Control signal 78C is sent to control wrapping actuator 78. Control signal 68C is sent to control valve 68 of additive nozzle 66. Control signals 160C and 162C are sent to control side wall compression actuator 160 and/or ceiling compression actuator 162. Control signal 152C is sent to control the tension applied to the twine strand 154 by knotter system 152.

It will be understood that when the controller 202 is described as sending a command signal to adjust a hydraulic actuator the controller 202 will actually send an electrical signal to an electro-hydraulic control valve that controls flow of hydraulic fluid to the hydraulic actuator.

Either the moisture sensor 218 or the sensor(s) 220 for detecting constituent properties other than moisture content may be selected from several types of sensors, including: near-infrared-reflectance (NIR) sensors, visible light cameras, ultra-violet light sensors, microwave sensors or a Terahertz sensor which may operate at a frequency in a range of from 0.1 Thz to 30 Thz. The sensors 218 and 220 may be combined in one sensor device or they may be separate sensors. One suitable sensor type for either the sensor 218 or 220 is the John Deere HarvestLab 3000 sensor available from Deere & Company, the assignee of the present application which operates based on NIR technology and can detect both moisture content and various characteristics other than moisture content.

In an exemplary embodiment relating to terahertz implementation, a terahertz-based sensor as penetrating characteristic sensor 218 or 220 may include a terahertz source disposed to direct terahertz electromagnetic radiation through a detection area to one or more terahertz detectors. In some examples, sensor 218 or 220 may only detect attenuation of terahertz electromagnetic radiation after passing through a crop area, in which case a single detector may be used and positioned to receive the attenuated terahertz electromagnetic radiation. In other embodiments, sensor 218 or 220 may only detect reflection of the terahertz electromagnetic radiation from a hay material within the detection area, in which case a single detector may be used and positioned to receive the reflected terahertz electromagnetic radiation. Of course, embodiments within the scope of the present disclosure may also include using both such detectors to detect attenuated terahertz electromagnetic radiation as well as reflected electromagnetic radiation. Further, those skilled in the art will appreciate that additional/alternate terahertz detectors can be used to detect other types of interactions, such as backscatter. The terahertz source and terahertz detectors may be configured to use a single frequency or in other examples, a plurality of frequencies.

A Terahertz sensor configured to generate and detect electromagnetic radiation with a frequency between 0.1 terahertz and 30 terahertz, defined herein as terahertz electromagnetic radiation (spectroscopy), is subject to significant laboratory research and shows promise for agricultural applications. Terahertz electromagnetic radiation lies between microwave and infrared on the electromagnetic spectrum and provides the advantage of at least partial penetration into objects, but is not considered ionizing radiation, like x-rays. As such, terahertz radiation does not trigger a requirement for a safety officer, nor is it subject to significant regulations, such as those that apply to x-rays. However, terahertz electromagnetic radiation does provide improved detection abilities over optical techniques, such as for example infrared (IR) and ultraviolet (UV). In accordance with embodiments described herein, terahertz electromagnetic radiation may be employed relative to crop material operations.

An exemplary terahertz source can be any suitable device capable of providing terahertz electromagnetic radiation to a plant part detection area. Examples of such suitable devices may include, without limitation, a femtosecond Ti-sapphire laser, an Yttrium Iron Garnet (YIG)-oscillator, a quantum cascade laser, a P-type germanium laser, a silicon-based laser; a free electron laser, a photoconductive switch, optical rectification, a backward-wave oscillator, a transferred electron device (i.e., Gunn diode), and a resonant tunneling diode. In embodiments where a number of frequencies within the contemplated terahertz range (0.1-30 terahertz) are desired, a variable frequency source can be used, such as a variable frequency quantum cascade laser. In other embodiments, a plurality of sources can be used with each source having a different band within the terahertz range. Additionally, it is expressly contemplated that the source may operate in a pulsed mode or a continuous wave mode.

Controller 202 includes or may be associated with a processor 204, a computer readable medium 206, a data base 208 and an input/output module or control panel 210 having a display 212. An input/output device 214, such as a keyboard, joystick or other user interface, is provided so that the human operator may input instructions to the controller. It is understood that the controller 202 described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product 216 such as a software module executed by the processor 202, or in a combination of the two. The computer program product 216 can reside in RAM memory, flash memory, ROM memory, EPROM memory, EEPROM memory, registers, hard disk, a removable disk, or any other form of computer-readable medium 206 known in the art. An exemplary computer-readable medium 206 can be coupled to the processor 204 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Methods of Operation:

The balers described above provide a sophisticated baler control system 200 which takes into account both moisture content and constituent parameters other than moisture content and which can control physical attributes of the formed bales including preservative additive and other physical attributes other than the amount of preservative additive.

The sensors 218 and 220 can detect moisture content and/or one or more constituent properties other than moisture content. The one or more constituent properties other than moisture content include one or more of the constituent properties selected from the group consisting of: dry matter content, crude protein content, crude starch content, neutral detergent fiber content, acid detergent fiber content, crude sugar content, crude fat content, metabolized energy content and oil content.

The sensors 218 and 220 can generate sensor signals corresponding to the moisture content and/or corresponding to the one or more constituent properties other than moisture content.

Those sensor signals are received in the controller 202 which in response generates one or more control signals going to the various actuators of the baler. In response to those control signals the actuators are adjusted to automatically adjust one or more physical characteristics of the bale as the bale is formed.

One physical characteristic of the bales which may be adjusted is the amount of preservative added, which may be controlled via the nozzle control valve 68.

Another physical characteristic of the bales which may be adjusted is the density or compaction of the bales. For the round baler 20 the density may be adjusted via the first and second tension cylinders 46 and 48. For the large rectangular baler 120 the density may be adjusted via the side wall compression actuator 160 and/or the ceiling compression actuator 162.

Another physical characteristic which may be adjusted is the wrap tension of the wrapping material used to wrap the bales. The wrapping material may be a sheet or net or it may be strands of twine. The wrap tension may be adjusted via the wrapping actuator 78 of the round baler 20 or via the knotter system 152 of the large rectangular baler 120.

Another physical characteristic which may be adjusted is the knife bank engagement. For higher moisture conditions, the use of fewer knives may help prevent clogging.

Another physical characteristic which may be adjusted is rotor speed which may be increased or decreased based on the crop constituent properties. For higher moisture content the rotor speed may be decreased. For higher fiber content the rotor speed may be increased.

Another physical characteristic which may be adjusted is the feeder system speed which may be increased or decreased based on the crop constituent properties. For higher moisture content the feeder system speed may be decreased. For higher fiber content the feeder system speed may be increased.

Another physical characteristic which may be adjusted is the diameter of the bale in a round baler. For higher moisture content a smaller diameter bale may be created. For higher fiber content a larger diameter bale may be created.

Another physical characteristic which may be adjusted is the pickup height of the pickup 36. For higher moisture content the pickup height may be raised to avoid pickup up the wettest material in the bottom of the windrow. For higher fiber content the pickup height may be lowered to collect all of the material in the windrow.

Still other physical characteristics of the bales may be adjusted.

The controller 202 may implement automatic adjustment algorithms to adjust one or more of the physical characteristics of the bale in response to a detected value of one or more of the constituent properties of the crop material other than moisture content.

And controller 202 may implement automatic adjustment algorithms to adjust one or more of the physical characteristics of the bale other than preservative additive in response to a detected value moisture content. For example, a more dense bale is less tolerant of high moisture content, thus the controller 202 may decrease density of the bales in response to a detected increase in moisture content of the crop material.

In addition to implementing automatic adjustment algorithms, the controller 202 may transmit recommendations to an operator of the baler 20 or 120 so that the operator may manually adjust certain parameters of the baler in response to those recommendations.

The following table describes some further examples of control based on properties other than moisture content.

| Constituent Value | Baler Setting (Preservative) | Tension Arm (Round Baler, Plunger Speed (LSB) | Wrap Tension Actuator |
|---|---|---|---|
| Moisture Content | High moisture - High preservative | High moisture, less tension | Tight tension required to minimize air ingress. |
| Acid Detergent Fiber Content | Less preservative | Higher tension arm pressure to compress into dense bales | Higher wrap tension to keep dense bales |
| Neutral Detergent Fiber Content | Less preservative | More tension arm pressure to achieve tight bales | Increase wrap tension needed to secure the shape and stability of the bales, for transport and storage |
| Lignin Content | Less preservative | More tension needed w.r.t threshold, might lead to deformation | Stronger wrap tension needed |
| Oil Content (especially canola crop type) | Less preservative | Requires less tension arm pressure to achieve a uniform bale: bales with more oil content are more pliable | Lower wrap tension might be sufficient, as bales might lose shape |
| Metabolized Energy Content | High ME - high Preservative | Less tension to avoid over compression | Moderate tension required |
| Crude Protein Content | Gentle preservative applied | Gentle tension arm pressure required | Lower wrap tension |
| Sugar Content | High Sugar - High preservative | Gentle tension arm pressure required | Gentle wrap tension required |

In addition to implementing automatic adjustment algorithms, the controller 202 may provide recommendations to the operator on the user interface 210, which operator may choose to select or once select to continue to perform automatic adjustments over the time.

In overall summary, high moisture bales require preservatives, moderate tension arm pressure, and tight wrap tension to prevent spoilage. Dry bales need less preservative intervention and can be baled with higher tension arm. For high acid detergent fiber (ADF), neutral detergent fiber (NDF) and Lignin, higher tension settings are required for both the tension arm and wrap tension to achieve and maintain dense bales. Preservatives are less critical unless moisture is a critical factor. For Crude Protein, Metabolized Energy, and Sugar, these constituents should be closely monitored, and these settings should be carefully controlled to avoid nutrient loss. Preservatives are often necessary and the tension arm and wrap settings needed to gentle to preserve the nutritional quality of the hay and forage. Higher oil content requires less tension in both tension arm and wrap tension; preservatives are generally less critical unless the crop also has high moisture.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A baler for forming a bale of crop material, comprising:
a bale chamber for forming the bale;
one or more constituent property sensors configured to detect one or more constituent properties other than moisture content of the crop material used to form the bale and to generate one or more sensor signals corresponding to the one or more constituent properties, wherein the one or more constituent properties other than moisture content include one or more of the constituent properties selected from the group consisting of: dry matter content, crude protein content, crude starch content, neutral detergent fiber content, acid detergent fiber content, crude sugar content, crude fat content, metabolized energy content and oil content;
one or more bale forming actuators configured to adjust one or more physical characteristics of the bale as the bale is formed; and
a controller configured to receive the sensor signals and to generate one or more control signals to the one or more bale forming actuators to adjust the one or more physical characteristics of the bale at least in part in response to the one or more sensor signals.

2. The baler of claim 1, further comprising:
a preservative additive system configured to add a preservative to the crop material, the preservative additive system including a nozzle and a nozzle control valve configured to control a flow rate of preservative added to the crop material, the nozzle control valve being one of the one or more bale forming actuators.

3. The baler of claim 1, further comprising:
a compression system configured to adjust a compression of the bale as the bale is formed in the bale chamber, the compression system including a compression actuator configured to adjust a density of the bale, the compression actuator being one of the one or more bale forming actuators.

4. The baler of claim 3, wherein the baler is a round baler for forming a round bale of crop material, wherein the compression system includes:
a tension belt; and
wherein the compression actuator includes a tension cylinder configured to place tension on the tension belt as the round bale is formed in the bale chamber.

5. The baler of claim 3, wherein the baler is a rectangular baler for forming a rectangular bale of crop material, wherein the compression system includes:
a plunger configured to compress the bale in the bale chamber; and
wherein the compression actuator is configured to adjust a cross-section of the bale chamber to thereby adjust the density of the rectangular bale as the rectangular bale is formed in the bale chamber.

6. The baler of claim 1, further comprising:
a wrapping system configured to wrap the bale with a wrap material, the wrapping system including a wrapping actuator configured to adjust a wrap tension of the wrapping material as the bale is wrapped, the wrapping actuator being one of the one or more bale forming actuators.

7. The baler of claim 1, wherein:
the one or more constituent property sensors include a near-infrared-reflectance (NIR) sensor.

8. The baler of claim 1, wherein:
the one or more constituent property sensors include a visible light camera.

9. The baler of claim 1, wherein:
the one or more constituent property sensors include an ultra-violet light sensor.

10. The baler of claim 1, wherein:
the one or more constituent property sensors include a Terahertz sensor operating at a frequency in a range of from 0.1 Thz to 30 Thz.

11. The baler of claim 1, further comprising:
a global navigation system sensor configured to detect a geographic position of the crop material being baled; and
wherein the controller is further configured to generate a constituent map recording the one or more constituent properties other than moisture content in relation to the geographic position of the crop material being baled.

12. The baler of claim 1, further comprising:
a moisture content sensor configured to generate a moisture content signal; and
wherein the controller is further configured to receive the moisture content signal and to generate the one or more control signals in part in response to the moisture content signal.

13. A baler for forming a bale of crop material, comprising:
a bale chamber for forming the bale;
one or more constituent property sensors configured to detect one or more constituent properties of the crop material used to form the bale and to generate one or more sensor signals corresponding to the one or more constituent properties, wherein the one or more constituent properties include one or more of the constituent properties selected from the group consisting of: moisture content, dry matter content, crude protein content, crude starch content, neutral detergent fiber content, acid detergent fiber content, crude sugar content, crude fat content, metabolized energy content and oil content;

one or more bale forming actuators configured to adjust compaction and/or wrap tension of the bale as the bale is formed; and a controller configured to receive the sensor signals and to generate one or more control signals to the one or more bale forming actuators to adjust the compaction and/or the wrap tension of the bale at least in part in response to the one or more sensor signals.

14. The baler of claim 13, wherein the baler is a round baler for forming a round bale of crop material, wherein the one or more bale forming actuators includes:

a tension belt; and a tension cylinder configured to place tension on the tension belt to adjust the compaction of the round bale as the round bale is formed in the bale chamber.

15. The baler of claim 13, wherein the baler is a rectangular baler for forming a rectangular bale of crop material, wherein the one or more bale forming actuators includes:

a plunger configured to compress the bale in the bale chamber; and a plunger actuator configured to move the plunger into the bale chamber to adjust the compaction of the rectangular bale as the rectangular bale is formed in the bale chamber.

16. The baler of claim 13, wherein the one or more bale forming actuators includes:

a wrapping system configured to wrap the bale with a wrap material, the wrapping system including a wrapping actuator configured to adjust the wrap tension of the wrapping material as the bale is wrapped.

17. The baler of claim 13, further comprising:

a global navigation system sensor configured to detect a geographic position of the crop material being baled; and wherein the controller is further configured to generate a constituent map recording the one or more constituent properties in relation to the geographic position of the crop material being baled.

18. A method of forming a bale of crop material, comprising:

detecting one or more constituent properties other than moisture content of the crop material using one or more constituent property sensors;

generating one or more sensor signals with the one or more constituent property sensors, the signals corresponding to the one or more constituent properties other than moisture content, wherein the one or more constituent properties include one or more of the constituent properties selected from the group consisting of: moisture content, dry matter content, crude protein content, crude starch content, neutral detergent fiber content, acid detergent fiber content, crude sugar content, crude fat content, metabolized energy content and oil content;

receiving the sensor signals with a controller;

generating one or more control signals with the controller; and adjusting one or more bale forming actuators in response to the one or more control signals, and thereby automatically adjusting one or more physical characteristics of the bale as the bale is formed.

* * * * *